United States Patent
Dynes et al.

(10) Patent No.: US 9,634,770 B2
(45) Date of Patent: Apr. 25, 2017

(54) QUANTUM COMMUNICATION SYSTEM

(71) Applicant: Kabushiki Kaisha Toshiba, Minato-ku (JP)

(72) Inventors: James Dynes, Cambridge (GB); Zhiliang Yuan, Cambridge (GB); Marco Lucamarini, Cambridge (GB); Andrew James Shields, Cambridge (GB)

(73) Assignee: Kabushiki Kaisha Toshiba, Minato-ku (JP)

( * ) Notice: Subject to any disclaimer, the term of this patent is extended or adjusted under 35 U.S.C. 154(b) by 0 days.

(21) Appl. No.: 14/734,286

(22) Filed: Jun. 9, 2015

(65) Prior Publication Data
US 2015/0372768 A1 Dec. 24, 2015

(30) Foreign Application Priority Data

Jun. 23, 2014 (GB) .................................... 1411114.0

(51) Int. Cl.
*H04B 10/00* (2013.01)
*H04B 10/70* (2013.01)
*H04J 14/00* (2006.01)

(52) U.S. Cl.
CPC .................................. *H04B 10/70* (2013.01)

(58) Field of Classification Search
CPC ..................................................... H04B 10/70
See application file for complete search history.

(56) References Cited

U.S. PATENT DOCUMENTS

| 7,627,126 B1 | 12/2009 | Pikalo et al. |
| 2004/0170438 A1 | 9/2004 | Kuribayashi |
| 2005/0047601 A1* | 3/2005 | Shields ............... H04B 10/70 380/283 |
| 2005/0100351 A1* | 5/2005 | Yuan ................... H04L 9/0858 398/214 |

(Continued)

FOREIGN PATENT DOCUMENTS

| EP | 1 499 040 A2 | 1/2005 |
| GB | 2 379 847 | 9/2003 |

(Continued)

OTHER PUBLICATIONS

United Kingdom Combined Search and Examination Report issued Nov. 17, 2014 in GB Application 1411114.0, filed on Jun. 23, 2014.

(Continued)

*Primary Examiner* — Daniel Dobson
(74) *Attorney, Agent, or Firm* — Oblon, McClelland, Maier & Neustadt, L.L.P.

(57) ABSTRACT

A transmitter for a quantum communication system, the transmitter comprising an interferometer, the interferometer having a first path with a phase modulator and a second path configured such that light pulses entering the interferometer follow either the first path or the second path, the output of the first and second paths being combined, the transmitter further comprising an optical filter positioned such that photons exiting the interferometer pass through the optical filter, the optical filter being configured to restrict the frequency range of pulses passing through the optical filter and temporally broaden the pulses.

17 Claims, 8 Drawing Sheets

(56) References Cited

U.S. PATENT DOCUMENTS

| | | | |
|---|---|---|---|
| 2005/0190921 A1 | 9/2005 | Schlafer et al. | |
| 2008/0050124 A1 | 2/2008 | Tsuchida et al. | |
| 2012/0328290 A1* | 12/2012 | Yuan | H04B 10/70 398/48 |

FOREIGN PATENT DOCUMENTS

| | | |
|---|---|---|
| GB | 2 430 124 A | 3/2007 |
| GB | 2492083 A | 12/2012 |
| JP | 11-72757 A | 3/1999 |
| JP | 11-298073 A | 10/1999 |
| JP | 2004-266542 A | 9/2004 |
| JP | 2006-166162 | 6/2006 |
| JP | 2008-52066 A | 3/2008 |
| JP | 2010-520447 A | 6/2010 |
| JP | 2013-13073 A | 1/2013 |
| WO | WO 2008/104799 A1 | 9/2008 |

OTHER PUBLICATIONS

Office Action issued on May 24, 2016 in Japanese Patent Application No. 2015-125779 (with English language translation).

Bernd Froehlich, et al., "A quantum access network", Nature, vol. 501, 2013, pp. 69-72 and Cover Page.

Search Report issued Nov. 29, 2016 in Application No. GB1411114.0.

Lei-Lei Huang, et al., "One-way Continuous-variable Quantum Key Distribution over 5km of Standard Telecom Fiber," 2007 Optical Society of America, Quantum Electronics and Laser Science Conference, 2007, 2 Pages.

S. Suchat, at al., "An Experiment of Optical Encryption Technique with Quantum Security for Mobile Phone Up-link Converter," Industrial Technology, IEEE ICIT'02, 2002, vol. 2, pp. 1245-1248.

Qing Xu, et al., "Towards Quantum Key Distribution System using Homodyne Detection with Differential Time-Multiplexed Reference," 2007 IEEE International Conference on Research, Innovation and Vision for the Future, Hanoi, 2007, pp. 158-165.

Patrick J. Clarke, et al., "An Analysis of Single-Photon Detectors in an Environmentally Robust GigaHertz Clock Rate Quantum Key Distribution System," OSA/CLEO 2011, Laser Science to Photonic Applications, 2011, 2 Pages.

J.F. Dynes, et al., "Decoy pulse quantum key distribution for practical purposes," Published in IET Optoelectronics, The Institution of Engineering and Technology 2008, vol. 2, No. 5, 2008, pp. 195-200.

* cited by examiner

QUANTUM COMMUNICATION SYSTEM

FIELD

Embodiments described herein relate generally to the field of quantum communication systems.

BACKGROUND

For quantum communication systems, information is sent between a transmitter and a receiver by encoded single quanta, such as single photons. Each photon carries one bit of information encoded upon a property of the photon, such as its polarisation, phase or energy/time and are termed quantum signals. The photon may even carry more than one bit of information, for example, by using properties such as angular momentum.

An example of quantum communication is quantum key distribution (QKD) which results in the sharing of cryptographic keys between two parties; a transmitter, often referred to as "Alice", and a receiver often referred to as "Bob". The attraction of this technique is that it provides a test of whether any part of the key can be known to an unauthorised eavesdropper (Eve). In many forms of quantum key distribution, Alice and Bob use two or more non-orthogonal bases in which to encode the bit values. The laws of quantum mechanics dictate that measurement of the photons by Eve without prior knowledge of the encoding basis of each causes an unavoidable change to the state of some of the photons. These changes to the states of the photons will cause errors in the bit values sent between Alice and Bob. By comparing a part of their common bit string, Alice and Bob can thus determine if Eve has gained information.

BRIEF DESCRIPTION OF THE DRAWINGS

Embodiments will now be described with reference to the following figures.

DETAILED DESCRIPTION

Figure 1:
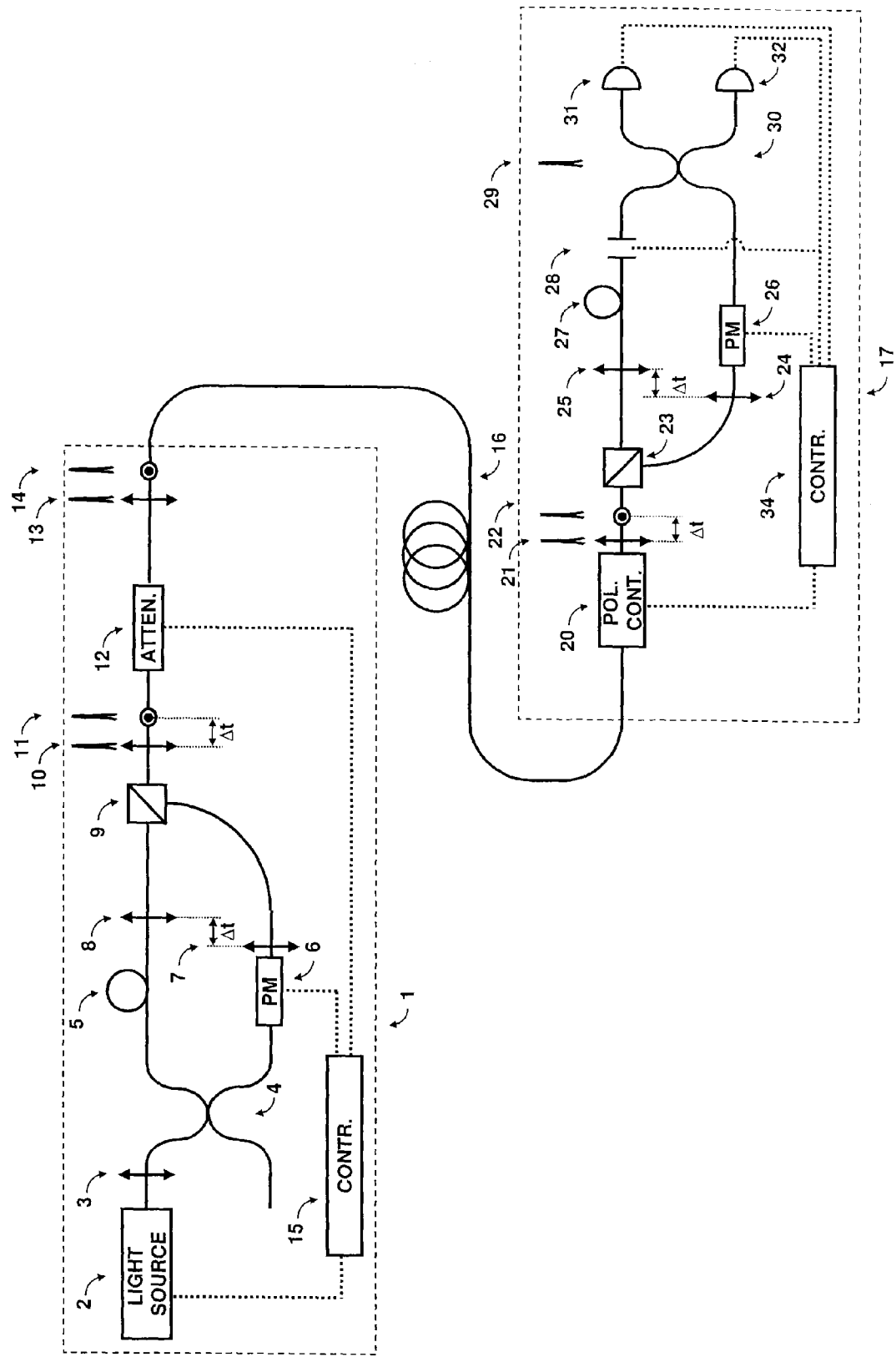
FIG. 1 is a schematic of a quantum communication system.

According to one embodiment, a transmitter for a quantum communication system is provided, the transmitter comprising an interferometer, the interferometer having a first path with a phase modulator and a second path configured such that light pulses entering the interferometer follow either the first path or the second path, the output of the first and second paths being combined, the transmitter further comprising an optical filter positioned such that photons exiting the interferometer pass through the optical filter, the optical filter being configured to restrict the frequency range of pulses passing through the optical filter and temporally broaden the pulses.

In an embodiment, the transmitter is part of a quantum communication system comprising single photon detectors, and wherein the single photon detectors are gated detectors having a gate "on-time" and wherein the optical filter is configured such that the temporal broadening of the pulse caused by the optical filter does not exceed the active "on time" of the single photon detectors. The optical filter may be configured such that the temporal broadening of the pulse caused by the optical filter is not less than 50% of the active "on time" of the single photon detectors.

When the transmitter is part of a quantum communication system, there are two interferometers, one in the transmitter and the other in the receiver. When the path differences introduced between the first and second paths of the interferometers are matched, the light pulses that take a first path through both interferometers can interfere with light pulses that take a second path through both interferometers if the length of the first and second paths is matched. In this situation, interference can occur between the pulses following the first path and the second path.

In an embodiment, a gain switched laser is configured to produce the said light pulses.

The optical filter may be integrated with optical fibres within the transmitter.

In a further embodiment, an interferometer for a quantum communication system is provided, the interferometer comprising a first path and a second path configured such that light pulses entering the interferometer follow either the first path or the second path, the output of the first and second paths being combined, the interferometer comprising a phase modulator in the first path, the interferometer further comprising a variable delay line in at least one of the paths, the interferometer further comprising a controller, said controller being configured to receive an input indicating the degree of interference of light pulses measured by said quantum communication system and adapted control the variable delay line in accordance with the input.

The above interferometer may be incorporated into either the emitter or the receiver. If incorporated into the emitter, it is possible to compensate for any potential losses caused due to the delay line.

The delay line may be used in combination with a fibre stretcher provided in a path of the interferometer in the receiver or in the emitter, and wherein said controller is configured to provide fine control over the path length by the fibre stretcher and coarse control using said delay line.

The degree of interference is indicated by the quantum bit error rate. The controller may be configured control the variable delay line in real time by constantly monitoring the bit error rate.

In an embodiment, the delay line is a free space delay line. The delay line may comprise a mechanically actuated mirror, the mirror being configured to move to vary the optical path within the delay line.

In an embodiment, the delay line is adapted to vary the delay by at least 1 ps. In a further embodiment, the delay line is adapted to vary to the delay by at least 5 ps. In a yet further embodiment, the delay line is configured to vary the delay by at least 10 ps. Further embodiments comprise delay lines that are adapted to vary the delay over 50 ps or more.

In a further embodiment, an interferometer for a quantum communication system is provided, the interferometer comprising a first path and a second path configured such that photons entering the interferometer follow either the first path or the second path, the output of the first and second paths being combined, the interferometer comprising a phase modulator in the first path, the interferometer further comprising an attenuator in at least one of the paths, the attenuator being configured attenuate the intensity of the light pulses passing through one path in the interferometer with respect to those in the other path of the interferometer.

The interferometer may be provided in the emitter or receiver of a quantum communication system. If placed in the emitter, the intensity of the light pulses emitted from the light source can be controlled to ensure that pulses of the correct intensity are sent to the receiver.

The controller may controls the attenuator in real time, for example by monitoring the quantum bit error rate (QBER).

Two or more of the above described filter, delay line or attenuator may be combined within the same system.

FIG. 1 is a schematic of a quantum communication system which is adapted to encode and decode optical pulses for quantum key distribution (QKD).

Transmitter 1 comprises a light source 2 that generates short light pulses which are linearly polarized 3 so the light travels along the slow axis of polarization maintaining fibre. However, although the light travels along the slow axis in the system of FIG. 1, in other systems, the light source can be coupled to the fibres such that the light travels along the fast axis. The light pulses then enter an asymmetric Mach-Zehnder interferometer (MZI) which, in this case, functions as a phase encoder for encoding random (key) information.

The Mach-Zehnder Interferometer is constructed using polarization maintaining fibre. First, the light pulses on entering MZI pass through coupler 4 that splits the incoming light pulses into two paths. In this example, the first path comprises a longer arm of the interferometer using an optical delay loop 5. The second, shorter path comprises a phase modulator 6. The phase modulator is used to encode random (key) information onto the light pulses. Due to the variation in the length of the arms, the light pulses 7 that follow the short path and the light pulses 8 that follow the long path have a temporal separation $\Delta t$.

This temporal separation may be set to ½ the inverse clock rate of the QKD system. The pulses are then combined at a polarizing beamsplitter (PBS) 9. The PBS has the property that one of the input arms polarization is rotated by 90 degrees. This results in an output which has a polarization that can be decomposed into two orthogonal polarizations 10 and 11, separated by a time $\Delta t$. The pulses are then attenuated to the single photon level using an optical attenuator 12 resulting in single photon pulses 13 and 14 before being emitted from the transmitter into an optical channel 16. Optical components in the transmitter are controlled using an electronic controller 15.

The optical pulses travel down optical channel 16 which could be an optical fiber link. The pulses then enter receiver 17. The receiver comprises an asymmetric MZI, which in this case functions as a decoder with a pair of single photon detectors 31 and 32.

The light pulses, on entering the receiver 17, first enter a polarization controller 20 before being sent through a polarising beam splitter (PBS) 23. The polarization controller 20 is adjusted such that it corrects any polarization rotation that occurred during transmission over the optical link 16. This results in the two orthogonal light pulses 21 and 22 which impinge with these polarizations onto the PBS 23.

The PBS 23 directs the light pulses either into the long arm 27, or the short arm of the MZI containing the phase modulator 26, depending on the input polarization of the light pulses. The phase modulator 26 is used in decoding the random (key) information on the light pulses. Again, as for the PBS 9 in the emitter, the PBS 26 has the property that one of the (in this case, output) arms polarization is rotated by 90 degrees. Consequently both outputs have the same polarization, 24 and 25. With the correct input polarization light pulse 24 should travel down the long arm of the transmitter interferometer and light pulse 25 should travel down the short arm of the interferometer.

In this way, the delay loop 27 cancels out the time difference between the two optical pulses $\Delta t$ and optical interference results at the final beamsplitter 30 due to complete overlap of the two light pulses 29. The overlap of the two pulses can be quantified by the system visibility (V) which is related to the QKD system quantum bit error rate (QBER)=(1−V)/2.

Fine tuning of the interference may be performed by adjusting the phase of the light pulse in the long arm using fibre stretcher 28 via controller 34. This compensates small (phase) changes in the interferometers due to thermal drifts.

The fibre stretcher is an electrically operated device. Several coils of fibre are wound around a piezoelectric stage. By applying a voltage to the stage, the fibre can be stretched thereby imparting an optical delay on light travelling through the fibre. The response time of a fibre stretcher is usually very quick ~1 kHz, making it suitable for correcting small and fast delay (phase) changes. In some embodiments, the maximum amount of stretch gives <1 ps of delay, although some fibre stretchers can tolerate extremely high voltages +/−400V which give several picoseconds of delay. However, these high voltage fibre stretchers can be bulky and require high voltage equipment to operate them.

Optical components in the receiver are controlled using an electronic controller 34. The controller also samples the resulting electrical signals from single photon detectors 31 and 32 when light pulses are detected.

In the above described system, there are the following assumptions:
(i) The two optical pulses from each arm of the decoder 22 arrive at the same time on the final beamsplitter 30.
(ii) The optical frequency of the light source does not time vary across the optical pulse.
(iii) The two optical pulses from each arm of the decoder 22 arrive at the final beamsplitter 30 with the same intensity.

Requirements (i)-(iii) should be satisfied to maintain high interferometeric visibility. However, if there are polarization degradation mechanisms present in the optical fibre link 16, the above requirements may not be fully satisfied. Polarization degradation mechanisms include optical pulse polarization rotation, polarization mode dispersion and polarization dependent loss. Polarization rotation is readily corrected by polarization controller 20 provided the polarization controller can track the rotation fast enough. Furthermore, polarization rotation does not usually cause a degradation in interferometric visibility if gated single photon detectors are used.

The effects of polarization mode dispersion (PMD) and polarization dependent loss (PDL) will now be explained with reference to FIG. 2. When the optical fibre link (16) is assumed to have finite PMD, this causes a time difference to emerge between orthogonal polarisations of the optical pulses. This can occur due to material, mechanical or thermal stresses to fibre. For a modern, 50 km spooled single mode fibre, the PMD value is typically <0.5 ps. However, for an older (legacy) 50 km installed fibre the PMD can be much greater; eg. 1-10 ps.

On the other hand, PDL causes an intensity difference to emerge between orthogonal polarisations of optical pulses. Similarly to PMD, PDL can be caused by material, mechanical or thermal stresses to fibre.

The two light pulses entering the asymmetric MZI of the receiver 17 have now acquired a time difference δt on top of the original time difference Δt 40 and 41, due to finite PMD. This additional time difference δt is preserved through the interferometer 42 and 43. The extra time difference means the interference at the final beamsplitter 30 is degraded since the light pulses no longer overlap completely 44. Thus requirement (i) is not satisfied and consequently there is a contribution to the reduction in the visibility V of the QKD system, the QBER increases and the final secure bit rate of the system will drop.

In quantum communication systems, sometimes reference pulses and signal pulses are sent. The signal pulses are used to convey encoded information from the transmitter to the receiver whereas the reference pulses are encoded and used as a zero phase reference to the encoded pulses. Often, the reference pulses will experience different PMD effects to those of the signal pulses.

Further, the optical frequency of the light source 1 can vary over the optical pulse. This can happen if a gain switched semiconductor laser diode is used for the light source. Gain switched semiconductor laser diodes are employed widely as light sources in quantum communication systems since they are cheap, compact and off the shelf. However, the optical spectrum from such diodes can be distorted, due to inherent frequency chirping. Frequency chirping gives rise to a time varying frequency over the optical pulse. Thus small changes in δt (due to PMD) of these chirped pulses leads to drastic drops in interferometeric visibility, as requirement (ii) is not satisfied. This effect severely degrades quantum communication system performance as there is a contribution to the reduction in the visibility V of the QKD system, the QBER increases and the final secure bit rate of the system will drop.

Optical pulses 40 and 41 also show a possible intensity mis-match resulting after traveling through the optical fibre link 16 with a finite PDL. Such an intensity difference means the interference at the final beamsplitter 30 is degraded since the light pulses no longer interfere completely (44). Thus requirement (iii) is not satisfied and consequently there is a contribution to the reduction in the visibility V of the QKD system. The QBER increases and the final secure bit rate of the system will drop.

Figure 3:
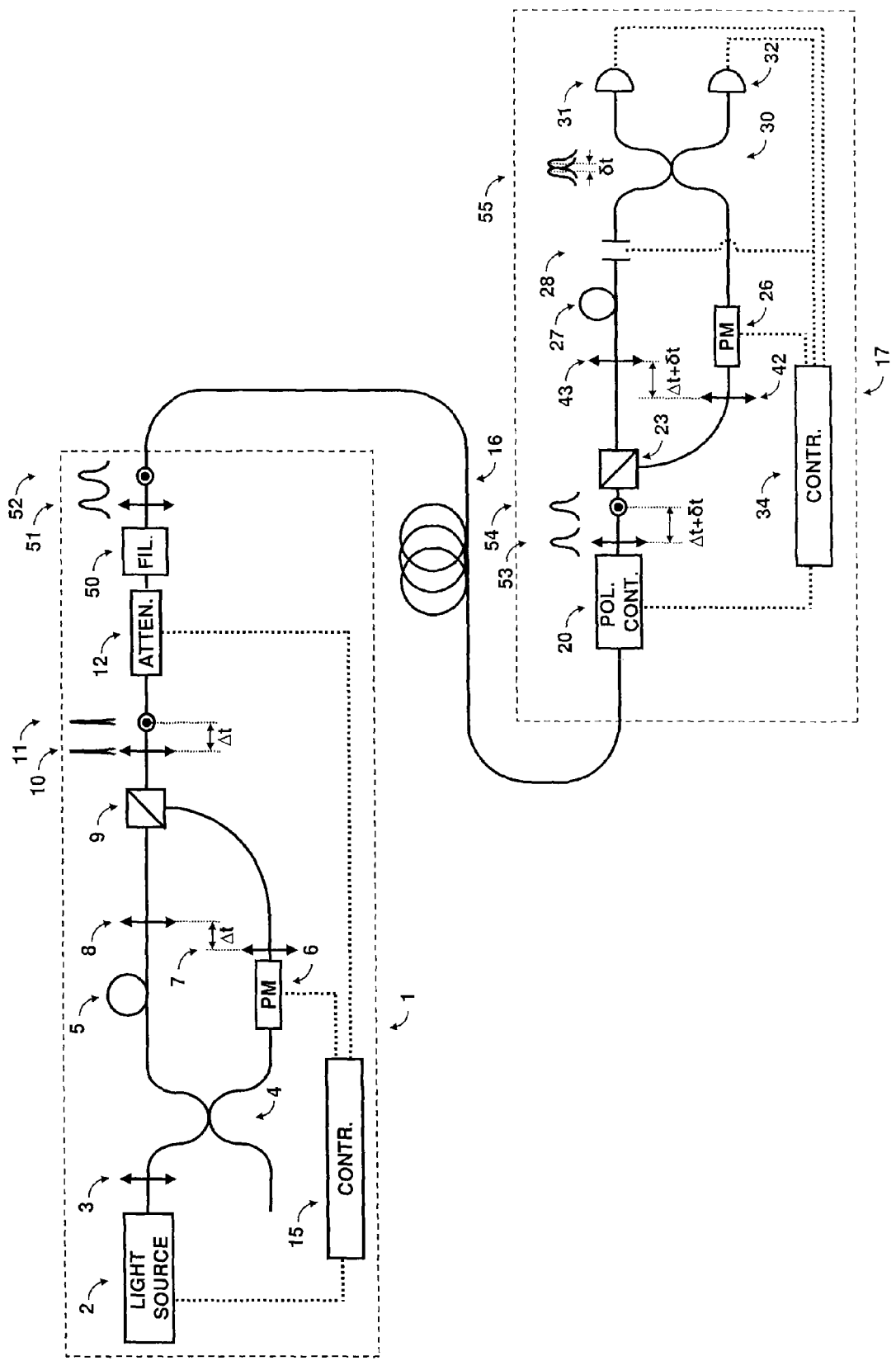
FIG. 3 is a schematic of a quantum communication system in accordance with a first embodiment, having a band pass filter.

FIG. 3 is a quantum communication system in accordance with an embodiment. A narrow bandwidth filter 50 at the emitter 1 is provided. By providing the filter 50 at the emitter 1, the system suffers no additional loss penalty. This is because the attenuator 12 can be modified to compensate for any loss in intensity caused by filter 50. When the pulses are sent along optical fibre link 16, the security of QKD is achieved if the pulses typically contain just a single photon, that way, if an eavesdropper intercepts the signal, their presence can be detected. If the intensity of the pulses is too great, then many pulses will contain more than one photon. If the intensity of the pulses is too small, then many pulses will contain no photons and the bit rate of the system will drop. There are many methods for selecting the optimum intensity for pulses and a discussion of this is outside the scope of this application. An example of a suitable technique is taught in "M. L. Lucarmarini et al. "Efficient decoy-state quantum key distribution with quantified security, *Opt. Express,* 21, pp. 24550-24565, 7 Oct. 2013". However, once the intensity for transmission along the fibre link 16 is determined, this intensity will be further reduced if the filter is provided in the receiver 17. However, the attenuator 12 can be adapted to compensate for any reduction in intensity caused by the filter 50 if the filter is provided within the emitter.

The filter 50 should temporally broaden the optical pulses emitted from light source 1. In an embodiment, to ensure the temporal broadening is optimal, the bandwidth chosen will result in a temporal optical pulse width that does not exceed the active "on time" of the single photon detectors 31 and 32 in the receiver 17. In an embodiment, the bandwidth chosen will result in a temporal optical pulse width that is close to the active on time of the single photon detectors 31, 32 in the receiver 17.

For example, consider a GHz clocked QKD system using self-differencing, single photon detectors. In this example, the optical pulse width emitted from the light source is 35 ps and the single photon detector active "on time" when gated at 1 GHz is 100 ps.

However, when using a filter 50 with a bandwidth of 15 GHz, the optical pulses 51 and 52 when emitted by the transmitter 1 and when they enter the receiver 17 as optical pulses 53 and 54 are now temporally wider. Since the optical pulse widths are broader in time, the tolerance for light pulse overlap is relaxed.

At the final beamsplitter 30 there is now a large amount of light pulse overlap between the two light pulses 55 despite the small time difference δt (picked up by the light pulses upon travelling down the optical link). Consequently the visibility V is improved over the case of the prior art and the QBER is reduced leading to a higher system secure bit rate.

In an embodiment, the maximum filter bandwidth is 100 GHz.

Also, the light source 2 can have a finite frequency chirp. The filter 50 placed at the transmitter 1 can also reduce the amount of frequency chirp generated by the light source 2.

Referring back to the example of a GHz clocked QKD system, in this example, the light source 2 is a gain switched laser diode which displays frequency chirps of the order of 100 GHz. Using a filter 50 with a bandwidth of 15 GHz, the chirp can be reduced which causes the optical frequency of the optical pulses 51 and 52, when emitted by the transmitter and when they enter the receiver 53 and 54, to change more slowly over the pulse envelope.

At the final beamsplitter 30 there is now improved light pulse interference between the two light pulses 55 despite the small time difference δt (picked up by the light pulses upon travelling down the optical link). Consequently the visibility V is improved over the and the QBER is reduced leading to a higher system secure bit rate.

In the above embodiment, the filter can simultaneously mitigate the effects of PMD by (i) temporal broadening of the optical pulse and (ii) reducing frequency chirp. For the example for the GHz clocked QKD system referred to above, using a 15 GHz filter, temporal broadening the optical pulses to close to the on time of the single photon detectors (100 ps) and reduces the light source frequency chirp by almost a factor of 10. This is enough to keep the visibility above 95% for PMD values up to 9 ps.

Figure 4A:
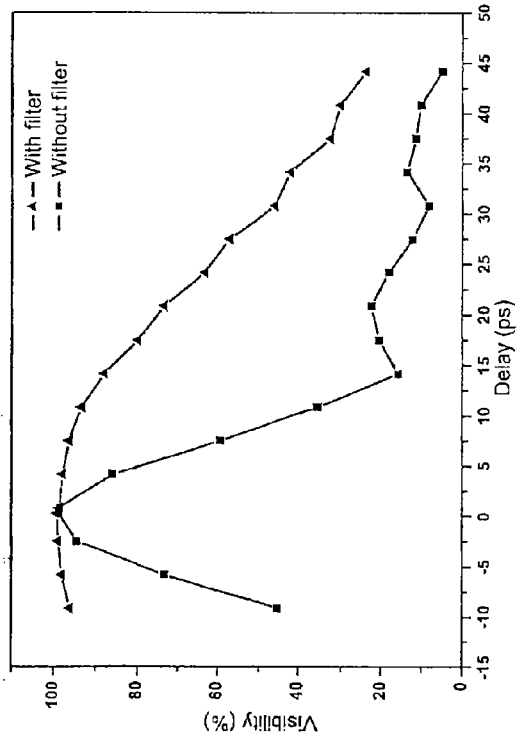
FIGS. 4A and 4B are plots of the comparison of visibility of interference fringes produced by the systems of FIGS. 1 and 3 against the separation between pulses and FIG. 4C shows calculated visibilities as a function of time delay $\delta t$ between pulses.

In FIG. 4A the visibility of a set of asymmetric Mach-Zehnder interferometers from the system of FIG. 1 plotted as a function of light pulse separation δt (squares labelled without filter). The light source 2 is a gain switched laser and possesses a temporal pulse width of 35 ps and a frequency chirp of more than 100 GHz. The light pulse delay is adjusted by a differential delay line after the transmitter output. Adjusting the differential delay line simulates the effect of PMD imparted delay on the light pulses emitted by a QKD transmitter over optical link possessing a finite PMD characteristic. The visibility at δt=0 is around 99%. This drops quickly to <40% for light pulse delays greater than δt~9 ps. Even for short delays of δt~2 ps leads to a drop in visibility to almost 90% (FIG. 4(b), squares). A change in visibility of 10%, gives a 5% additional contribution to the QBER. For a QKD system operating at a base QBER of a few percent a 5% additional contribution to QBER usually reduces the secure bit rate to almost zero.

Figure 4B:
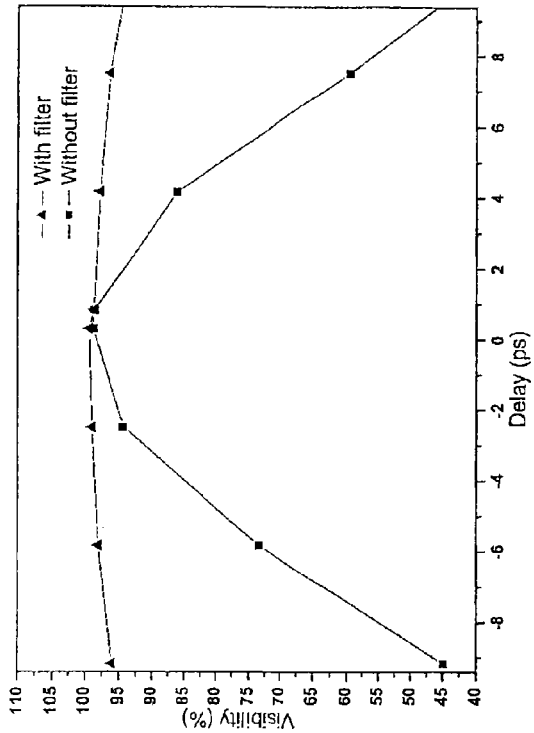

FIG. 4A also shows the visibility of a set of asymmetric Mach-Zehnder interferometers from the setup described in FIG. 3 plotted as a function of light pulse separation δt (triangles labelled with filter). The filter has a bandwidth of 15 GHz. As in the prior art, the visibility at δt=0 is around 99%. However, the drop in visibility is much slower as a function of light pulse separation, δt. For light pulse separations up to 9 ps, the visibility is 95% or above, (FIG. 4B, triangles). For short delays of δt~2 ps the drop in visibility is negligible. Thus there will be almost no increase in QBER for δt up to 2 ps.

Figure 4C:
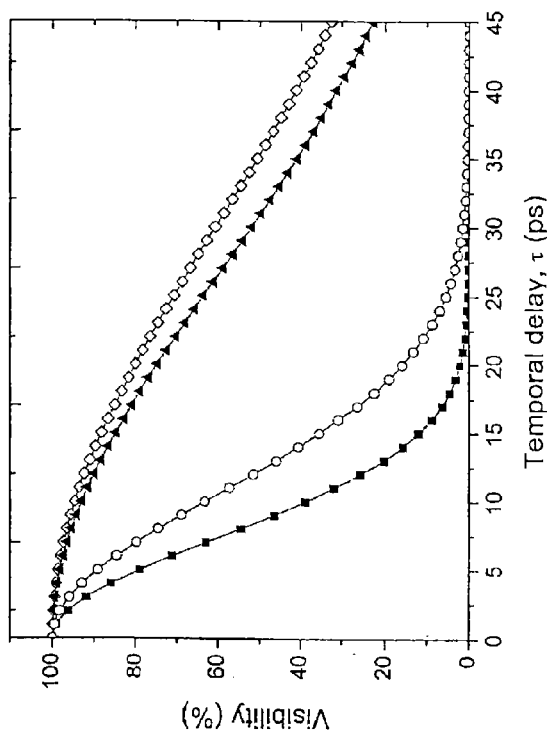

FIG. 4C shows calculated visibilities as a function of time delay δt. The curve with squares shows the visibility dependence without filter. The curve with circles shows the visibility dependence with the 15 GHz filter assuming only the optical pulses broaden in time and the frequency chirp is not compensated for. The curve with triangles shows the visibility dependence with the 15 GHz filter with both optical pulses broadening in time and the frequency chirp compensation. The curve with diamonds shows the visibility dependence with the 15 GHz filter when the frequency chirp is completely removed.

Figure 5:
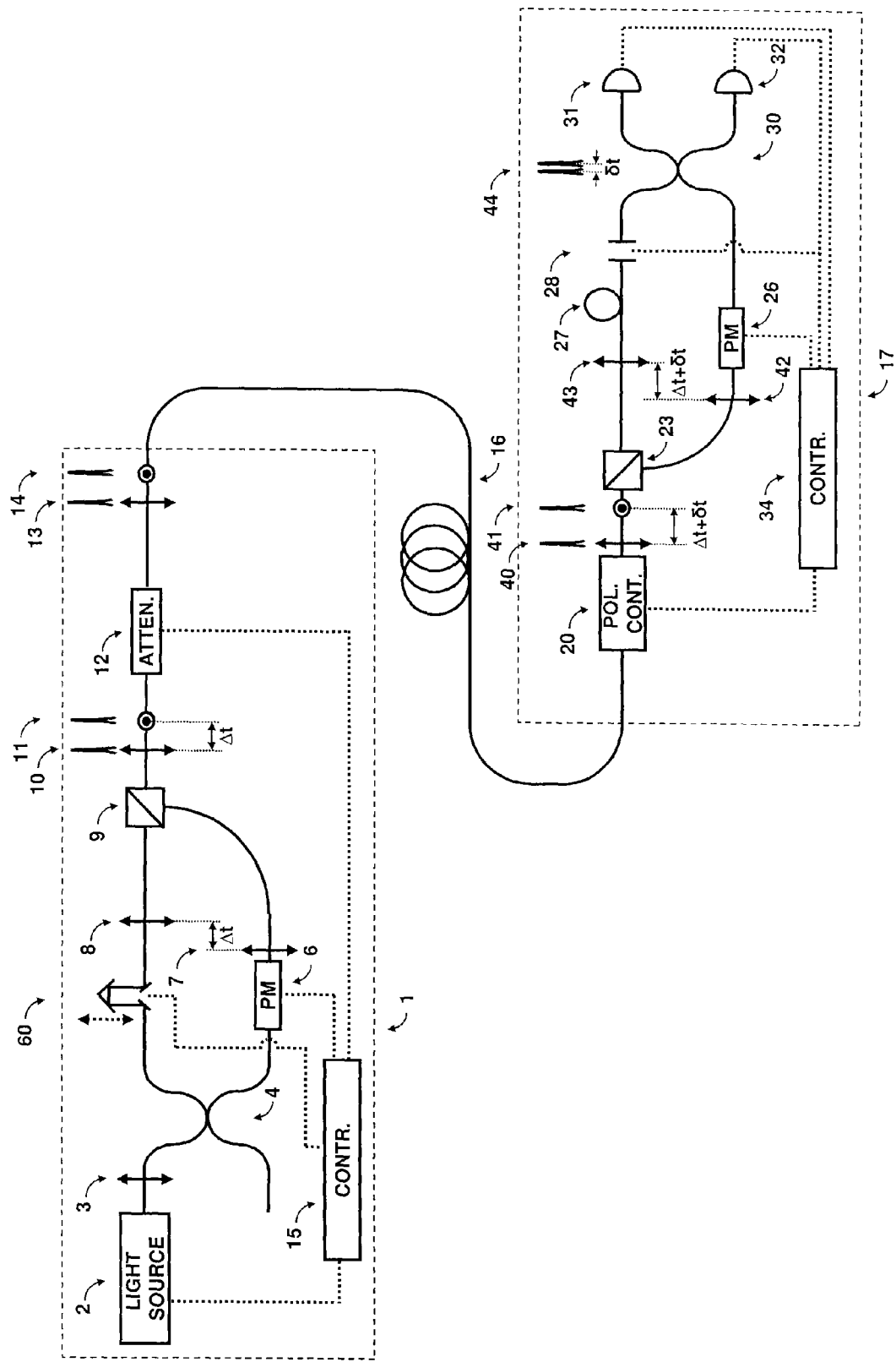
FIG. 5 is a schematic of a quantum communication system in accordance with a second embodiment, having a delay line.

FIG. 5 shows a variation on the quantum communication system of FIG. 1. To avoid any unnecessary repetition, like reference numerals will be used to denote like features. In the system of FIG. 5, the fixed optical delay loop is replaced with an electronically adjustable optical delay 60. The delay introduced by electronically adjustable delay can be varied by controller 15. In this embodiment, there is no increase in QKD system footprint.

The electrically operated optical delay usually takes the form of a mirror on an electrically controllable movable stage. In an embodiment, light from the input fibre is collimated using a lens in free space and directed to the mirror, which could be a 45 degree, corner cube mirror. Light will then be reflected from the mirror spatially displaced from the input light. The reflected light is collected and focused into the output fibre. By moving the mirror, an adjustable delay can be imparted onto the optical path. Since the mirror can move of the order of centimeters, the optical delay imparted can be >100 ps. As the optical delay is due to a mechanical movement of a mirror, the response time is typically slow; also there will be some vibration as the mirror is moved. Thus an optical delay line is not suitable for correcting fast but small delay (phase) changes; it is more suitable for slow and large delay changes. Slow and large delay changes can be caused by polarisation effects.

The delay line may also be used to additionally balance the path length through the system during the initial set up of the system. However, in the embodiment of FIG. 5, the delay line is actuated during operation of the system to accommodate for polarisation effects.

By adjusting the delay between the light pulses, any additional delay δt imparted on the light pulses as they travel down the optical link can be cancelled out. Thus at the final beamsplitter 30 the pulse overlap between the two light pulses 44 can be maximised by making the small time difference δt=0. Consequently the visibility V is improved over the case of the prior art and the QBER is reduced leading to a higher system secure bit rate.

The controller 15 can be used to vary the electronic delay line in real time by varying the delay in accordance with a measure of the degree of interference. In one embodiment, this is the QBER, but other measures could be used.

In a further embodiment, stabilisation pulses (sometimes used to align the phase of the interferometers) may be used a feedback signal. Such stabilisation pulses can be sent interposed between signals carrying information concerning the quantum key to allow real time feedback. The stabilisation pulses may be randomly positioned in the stream of pulses from the transmitter.

In a further embodiment, the controller 15 adjusts both the fibre stretcher 28 and the electronic delay line 60. The electronic delay line will be able to provide a greater variation on the path length than achievable via a fibre stretcher alone. For example, the delay line may be able to vary the delay line over picoseconds (hundreds of wavelengths). In an embodiment, the electronic delay line is used to provide coarse control over the delay between the two paths, whereas the fibre stretcher is configured to provide fine tuning. Fibre stretchers typically have a very short range; only a few wavelengths. There are fibre stretchers which extend into the pico second range, but they typically can be expensive, bulky and require extremely high voltages (e.g. 400 V) to achieve large variations in the path length.

In FIG. 5, the fibre stretcher 28 is provided in the receiver 17, whereas the optical delay line 60 is provided in the transmitter 1. In this embodiment, the controller 15 communicates via a classical channel with controller 34 in order to control fibre stretcher 28. It will be appreciated that the alternate arrangement can be made where the controller 34 is the dominant controller and serves to control the delay line 60 through the controller 15. In a further arrangement, the optical delay line 60 and the fibre stretcher are both provided in either the transmitter 1 or receiver 17.

As explained in relation to the above embodiment, the delay line and fibre stretcher can be used together. For example, the delay line can be used to make a coarse adjustment and then the fibre stretcher is used to make a fine adjustment. In an embodiment, this process can be repeated until the QBER reaches a minimum value.

In an embodiment, the delay line 60 is provided in the transmitter 1 as any losses caused by the delay line can be compensated for by the attenuator 12 prior to sending the pulses over the fibre link. However, the electronic delay line 60 may also be provided in the receiver 17. The fibre stretcher 28 and the electronic delay line 60 may be both provided in the transmitter 1, both provided in the receiver 17, the delay line 60 the transmitter 1 and the fibre stretcher 28 in the receiver 17 or vice versa.

Figure 6:
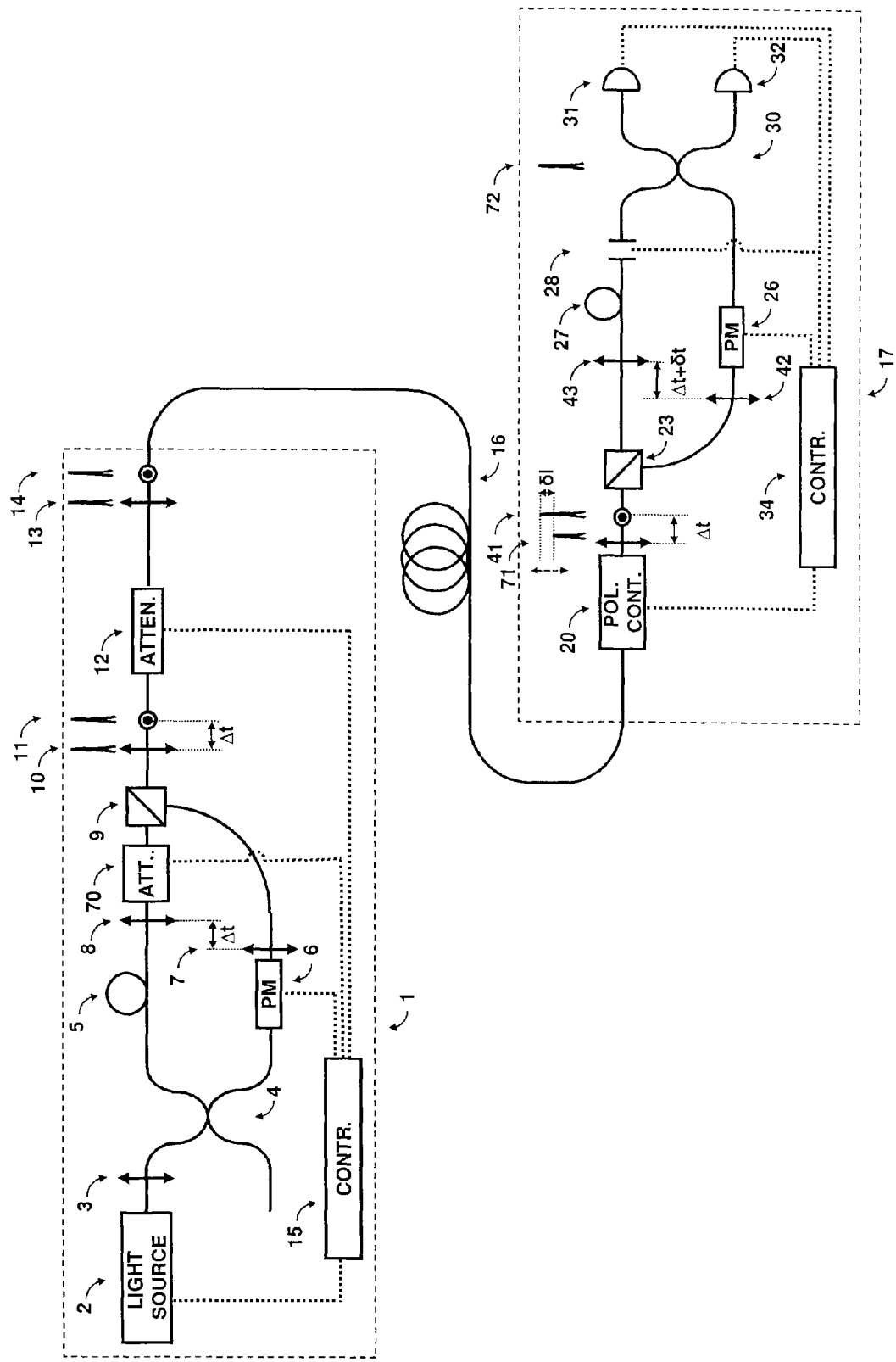
FIG. 6 is a schematic of a quantum communication system in accordance with a third embodiment, having an attenuator.

FIG. 6 shows a variation on the quantum communication system of FIG. 1. To avoid any unnecessary repetition, like reference numerals will be used to denote like features. In FIG. 6, an electronically adjustable optical attenuator 70 is placed in one of the arms of Alice's interferometer. In this optical attenuator 70 is shown in the long arm but equally it could be placed in the short arm. The attenuation provided by electronically adjustable attenuator 70 can be adjusted by controller 15. Adjustable attenuators are usually incorporated in interferometers. By simply making the interferometer optical attenuator 70 electronically adjustable, there is no increase in QKD system footprint. Furthermore the attenuator resides at the transmitter 1, so there is no loss penalty for the QKD system. Thus, the intensity of the signal from the light source can be configured to meet the requirements of the attenuator without compromising on the intensity of the signals to be sent along the fibre to the receiver.

Optical pulses travel down the optical link which possesses a finite PDL. Optical pulses suffer an intensity mismatch due to orthogonal polarizations being attenuated differently (due to PDL). Upon entering the receiver 17, the intensity mismatch is shown by the different heights of pulses 71 and 41, δI. By adjusting the attenuator 70 this intensity mismatch δI imparted on the light pulses as they travel down the optical link can be cancelled out. Thus at the final beamsplitter 30 the pulse heights of the two light pulses 72 can be equalized by making the small intensity difference δI=0. Consequently the visibility V is improved over the case of the prior art and the QBER is reduced leading to a higher system secure bit rate. Electronically adjustable delay 70 can be adjusted by using either the QBER or stabilisation pulses (usually used to align the phase of the interferometers) as a feedback signal.

Figure 2:
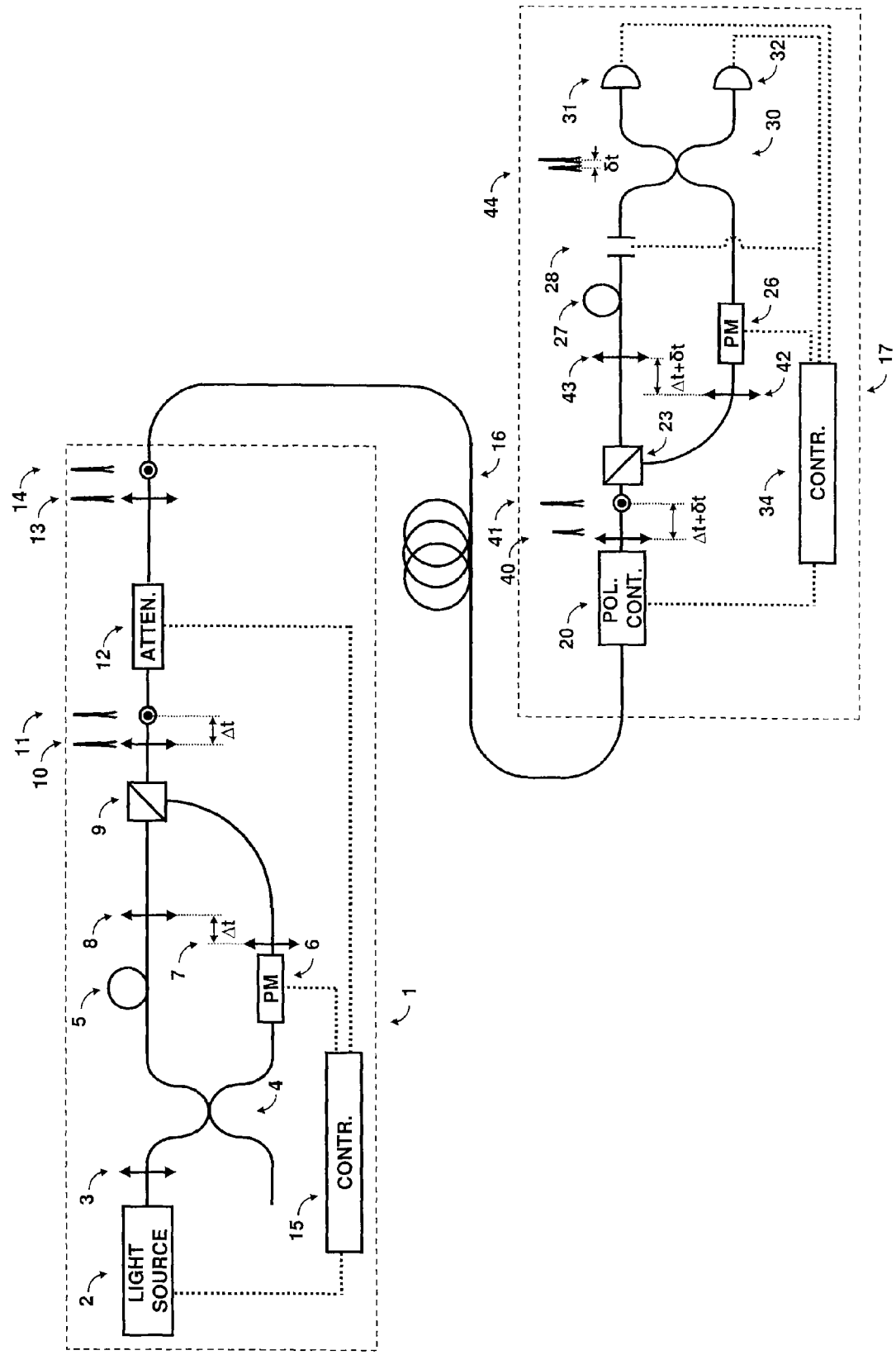
FIG. 2 is a schematic of a quantum communication system demonstrating the effects of polarisation mode dispersion (PMD) and polarisation dependent loss (PDL)
Figure 7:
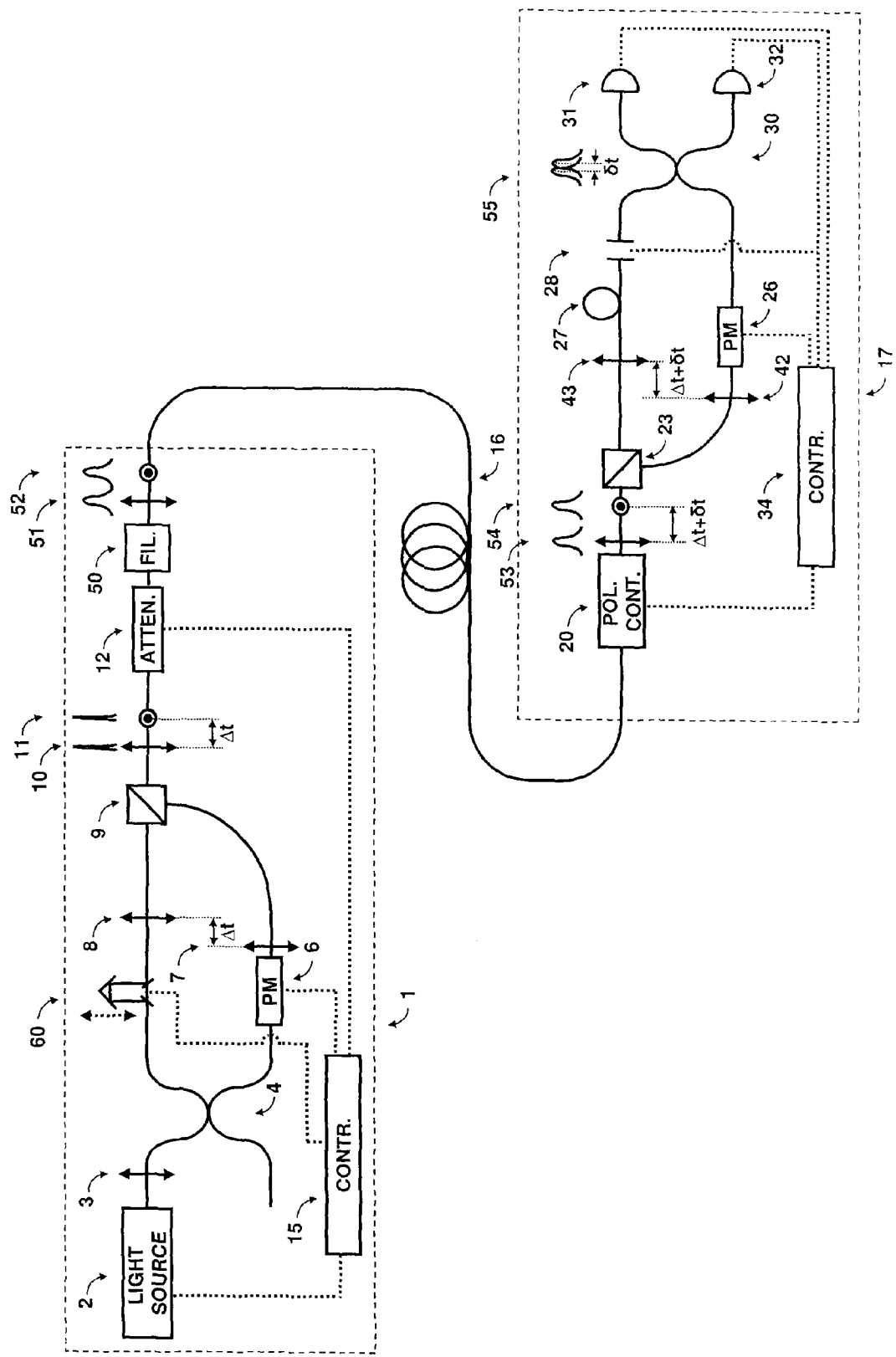
FIG. 7 is a schematic of a quantum communication system in accordance with a further embodiment, having a band pass filter and a delay line.

The systems of FIGS. 2 to 3 and 5 above can also be combined. In FIG. 7, the filter 50 of FIG. 3 is used in combination with the electronically adjustable delay line, this has the advantage that the filter 50 can compensate moderate changes in PMD as well as light source frequency chirp. At the same time electronically adjustable optical delay 60 can compensate larger and faster changes in PMD.

Figure 8:
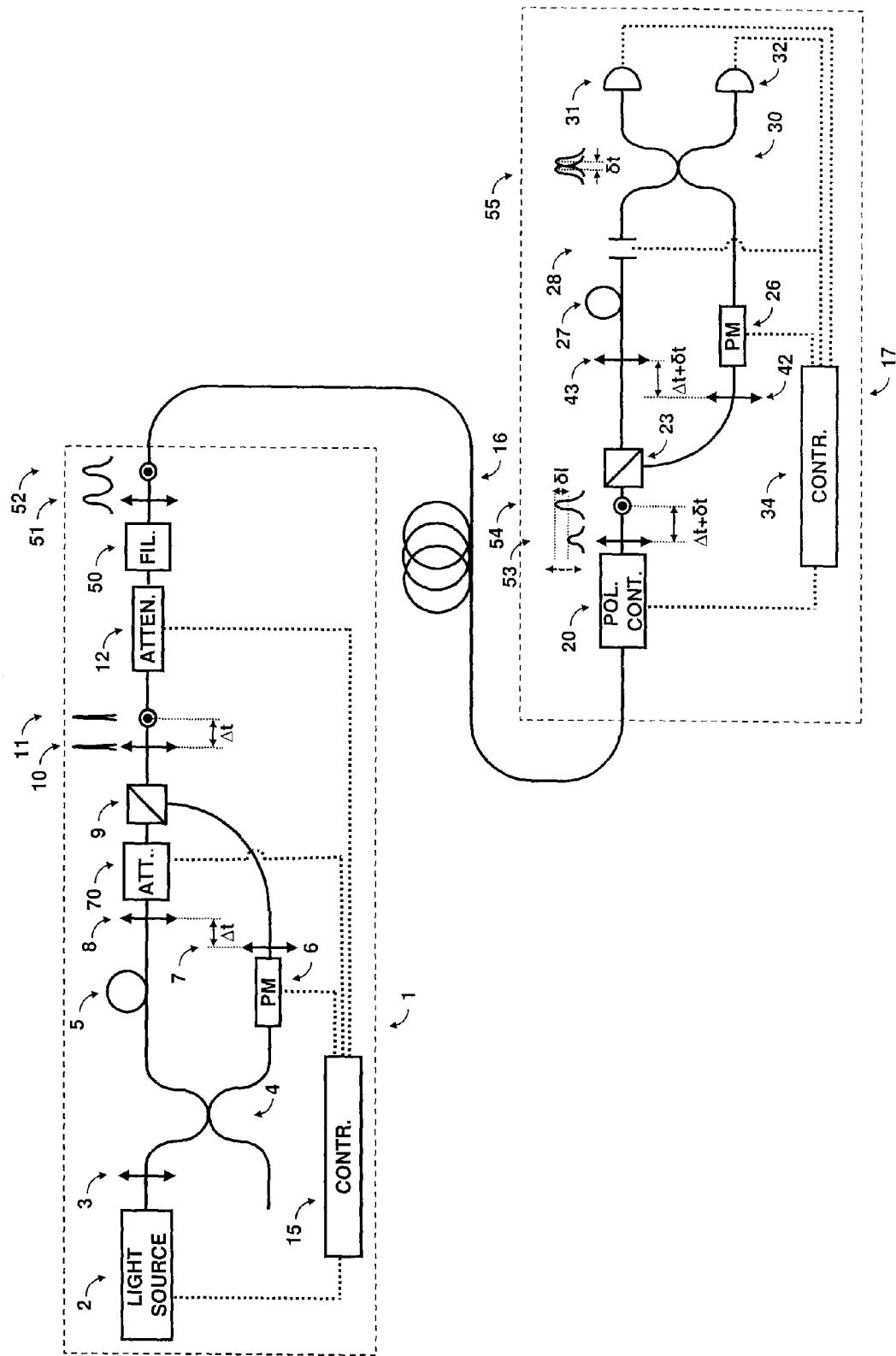
FIG. 8 is a schematic of a quantum communication system in accordance with a yet further embodiment, having a band pass filter and an attenuator.

In FIG. 8, the filter 50 of FIG. 3 is used in combination with the adjustable attenuator of FIG. 5, this mitigates the effect of PMD and PDL when optical link has finite polarization mode dispersion (PMD) and finite polarization dependent loss (PDL).

In systems in accordance with the above embodiments, PMD and PDL effects are considered and compensated. In deployed fibres the PMD coefficient and PDL can be high, especially if the fibre is old and/or contains many splices and connections. Furthermore, deployed fibre is often supported outdoors by utility poles. This makes the fibre characteristics susceptible to environmental disturbances such as from local weather conditions. Consequently the PMD coefficient and PDL can vary with time which can adversely affect quantum communication system performance. The above systems can handle these situations, without degradation in performance.

In summary, in the above embodiments, the problems of finite and changing PMD for quantum communication systems are considered. PMD introduces an extra time difference between the reference and encoded pulses which lead to a drop in interferometeric visibility—and hence an increase in quantum communication system error rate. In the system of FIG. 3, a filter is used to both temporally broaden the optical pulses and reduce frequency chirp so the visibility will change less for an increase in PMD. In the system of FIG. 5, the PMD imparted delay can be cancelled out by adjusting the optical delay in one arm of the transmitter encoder. In the system of FIG. 7, a combination of the systems of FIGS. 3 and 5 can provide PMD mitigation for both slow varying PMD with a chirped laser and fast varying PMD simultaneously.

In the system of FIG. 6, finite and changing PDL for quantum communication systems is considered. PDL introduces an extra intensity difference between the reference and encoded pulses which also lead to a drop in interferometeric visibility—and hence an increase in quantum communication system error rate. The system of FIG. 6 uses a variable attenuator of one arm of the interferometer encoder in the transmitter. By adjusting this attenuator to keep the intensity of the pulses at the receiver's interferometer final beam splitter equal, high visibilities can be maintained.

The above described systems also have the advantages that they are:
1. Cheap to implement: only requires off the shelf filters.
2. Compact: filters have very small (cm×mm footprints), electrical optical delay can be incorporated in existing interferometers, electrical variable optical attenuator can be incorporated in existing interferometers—with no loss penalties.

While certain embodiments have been described, these embodiments have been presented by way of example only, and are not intended to limit the scope of the inventions. Indeed, the novel methods and systems described herein may be embodied in a variety of other forms; furthermore, various omission, substitutions and changes in the form of the methods and systems described herein may be made without departing from the spirit of the inventions. The accompanying claims and their equivalents are intended to cover such form or modifications as would fall within the scope and spirit of the inventions.

The invention claimed is:

1. A transmitter for a quantum communication system, the transmitter comprising:
   an interferometer, the interferometer having a first path with a phase modulator and a second path configured such that light pulses entering the interferometer follow either the first path or the second path, an output of the first and second paths being combined;
   an optical filter positioned such that photons exiting the interferometer pass through the optical filter, the optical filter being configured to restrict a frequency range of pulses passing through the optical filter and temporally broaden the pulses; and
   a gain switched laser configured to produce said light pulses.

2. A transmitter according to claim 1, wherein the transmitter is part of a quantum communication system comprising single photon detectors, and wherein the single photon detectors are gated detectors having a gate on time and wherein the optical filter is configured such that the temporal broadening of the pulse caused by the optical filter does not exceed an active on time of the single photon detectors.

3. A transmitter according to claim 2, wherein the optical filter is configured such that the temporal broadening of the pulse caused by the optical filter is not less than 50% of the active on time of the single photon detectors.

4. A transmitter according to claim 1, wherein said optical filter is integrated with optical fibres within the transmitter.

5. A transmitter for a quantum communication system according to claim 1, wherein the interferometer further comprises a variable delay line in at least one of the paths, the transmitter further comprising a controller, said controller being configured to receive an input indicating a degree of interference of light pulses measured by said quantum communication system and configured to control the variable delay line in accordance with the input.

6. A transmitter for a quantum communication system according to claim 1, wherein the interferometer further comprises an attenuator in at least one of the paths, the attenuator being configured attenuate an intensity of the light pulses passing through one path in the interferometer with respect to those in the other path of the interferometer.

7. A transmitter for a quantum communication system according to claim 1, wherein the interferometer further comprises a variable delay line in at least one of the paths, the transmitter further comprising a controller, said controller being configured to receive an input indicating a degree of interference of light pulses measured by said quantum communication system and configured to control the variable delay line in accordance with the input, the interferometer further comprising an attenuator in at least one of the paths, the attenuator being configured attenuate an intensity of the light pulses passing through one path in the interferometer with respect to those in the other path of the interferometer.

8. A quantum communication system comprising an emitter and a receiver, wherein the emitter or receiver comprises:
a first interferometer, the first interferometer comprising a first path and a second path configured such that light pulses entering the first interferometer follow either the first path or the second path, an output of the first and second paths being combined, the first interferometer comprising a phase modulator in the first path, the first interferometer further comprising a variable delay line in at least one of the paths, the first interferometer further comprising a controller, said controller being configured to receive an input indicating a degree of interference of light pulses measured by said quantum communication system and configured to control the variable delay line in accordance with the input,
wherein the other of said emitter or receiver comprises:
a second interferometer comprising a first path and a second path configured such that light pulses entering the second interferometer follow either the first path or the second path, the output of the first and second paths being combined,
wherein the controller is configured to control the variable delay line in accordance with a measurement indicating a degree of interference between light pulses passing through the first interferometer and the second interferometer,
the quantum communication system further comprising a fiber stretcher provide in a path of the first interferometer or the second interferometer, and wherein said controller is configured to provide fine control over a path length by the fiber stretcher and coarse control using said delay line.

9. A quantum communication system according to claim 8, wherein the degree of interference is indicated by a quantum bit error rate.

10. A quantum communication system according to claim 8, wherein the controller controls the variable delay line in real time.

11. A quantum communication system according to claim 8, wherein the first interferometer is in the emitter and the second interferometer is in the receiver.

12. A quantum communication system according to claim 8, wherein the delay line is controllable to vary the delay over at least one picosecond.

13. A quantum communication system according to claim 8, further comprising an attenuator in at least one of the paths, the attenuator being configured attenuate an intensity of the light pulses passing through one path in the interferometer with respect to those in the other path of the interferometer.

14. An interferometer for a quantum communication system, the interferometer comprising:
a first path and a second path configured such that photons entering the interferometer follow either the first path or the second path, an output of the first and second paths being combined;
a phase modulator in the first path; and
an attenuator in at least one of the paths, the attenuator being configured attenuate an intensity of the light pulses passing through one path in the interferometer with respect to those in the other path of the interferometer,
wherein the system further comprises a controller configured to control the attenuator to attenuate an intensity of the light pulses such that the light pulses passing through the first and second paths of the interferometer in the receiver are substantially equal.

15. A quantum communication system comprising an emitter and a receiver, wherein the emitter or receiver comprises an interferometer according to claim 14, the other of said emitter or receiver comprising an interferometer having a first path and a second path configured such that light pulses entering the interferometer follow either the first path or the second path, an output of the first and second paths being combined.

16. A quantum communication system according to claim 15, wherein the controller controls the attenuator in real time.

17. A quantum communication system comprising an emitter and a receiver, wherein the emitter comprises an interferometer according to claim 14, the receiver comprising an interferometer having a first path and a second path configured such that light pulses entering the interferometer follow either the first path or the second path, an output of the first and second paths being combined.

* * * * *